United States Patent
Malhotra et al.

(10) Patent No.: US 9,571,155 B2
(45) Date of Patent: Feb. 14, 2017

(54) METHOD OF STARTUP SEQUENCE FOR A PANEL INTERFACE

(71) Applicant: SAMSUNG DISPLAY CO., LTD., Yongin, Gyeonggi-Do (KR)

(72) Inventors: Gaurav Malhotra, Cupertino, CA (US); Amir Amirkhany, Sunnyvale, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/832,938

(22) Filed: Aug. 21, 2015

(65) Prior Publication Data
US 2016/0056859 A1 Feb. 25, 2016

Related U.S. Application Data

(60) Provisional application No. 62/041,530, filed on Aug. 25, 2014.

(51) Int. Cl.
| | |
|---|---|
| *H04L 25/34* | (2006.01) |
| *H04L 25/49* | (2006.01) |
| *H04B 3/23* | (2006.01) |
| *H04L 7/00* | (2006.01) |

(52) U.S. Cl.
CPC ............ *H04B 3/238* (2013.01); *H04L 7/0008* (2013.01)

(58) Field of Classification Search
CPC .......... G06F 1/10; H04J 3/0685; H04J 3/0688; H04J 3/0638; H04L 7/0008
USPC ................. 375/224–228, 286–294, 354–376
See application file for complete search history.

(56) References Cited

U.S. PATENT DOCUMENTS

| | | | | |
|---|---|---|---|---|
| 3,671,671 A | * | 6/1972 | Watanabe | H04L 25/0272 178/63 R |
| 3,949,168 A | * | 4/1976 | Taub | H04L 12/40 178/69 R |
| 4,172,963 A | * | 10/1979 | Belcher | H04K 1/00 370/242 |
| 4,627,076 A | * | 12/1986 | Staal | H01B 11/00 375/257 |
| 4,719,458 A | * | 1/1988 | Miesterfeld | F02D 41/266 370/447 |
| 4,847,867 A | * | 7/1989 | Nasu | G06F 13/4256 370/503 |

(Continued)

FOREIGN PATENT DOCUMENTS

| | | |
|---|---|---|
| KR | 10-2006-0096739 A | 9/2006 |
| KR | 10-2014-0056615 A | 5/2014 |

*Primary Examiner* — James M Perez
(74) *Attorney, Agent, or Firm* — Lewis Roca Rothgerber Christie LLP

(57) ABSTRACT

A system for starting a point-to-multi-point serial communications system. The system includes a transmitter having a sync connection and a plurality of data outputs and a plurality of receivers, each of the plurality of receiver having a sync connection and a data input; the data input of each of the plurality of receivers being connected to a respective one of the plurality of data outputs of the transmitter; and the sync connection of the transmitter being connected, by a conductor, to the sync connection of each of the plurality of receivers, each of the plurality of receivers comprising a first impedance and a first switch, the first impedance and the first switch configured to establish, when the first switch is closed, a current path between the sync connection of the receiver and a first voltage source in the receiver.

20 Claims, 6 Drawing Sheets

(56) References Cited

U.S. PATENT DOCUMENTS

| | | | | | |
|---|---|---|---|---|---|
| 4,888,764 | A * | 12/1989 | Haug | | H04L 12/40 375/219 |
| 4,994,690 | A * | 2/1991 | Sundstrom | | G06F 13/4072 326/30 |
| 5,272,476 | A * | 12/1993 | McArthur | | H04Q 9/16 340/10.2 |
| 5,448,258 | A * | 9/1995 | Edwards | | G09G 3/2011 345/90 |
| 6,529,054 | B1 * | 3/2003 | Hanson | | G11C 7/1006 327/144 |
| 6,668,031 | B1 * | 12/2003 | Hanson | | H04L 7/0008 327/141 |
| 6,836,546 | B1 * | 12/2004 | Willer | | H04M 3/005 379/390.02 |
| 6,839,210 | B2 | 1/2005 | Roberts | | H02H 7/22 361/64 |
| 7,366,115 | B2 * | 4/2008 | Vandensande | | G05B 19/0423 370/257 |
| 7,590,922 | B2 * | 9/2009 | Vedantham | | H04L 1/1628 714/776 |
| 7,729,427 | B2 * | 6/2010 | Kwok | | H04B 3/542 326/30 |
| 8,064,535 | B2 * | 11/2011 | Wiley | | H04L 5/20 341/58 |
| 8,446,977 | B2 * | 5/2013 | Ovchinnikov | | H04B 3/50 375/257 |
| 8,619,492 | B2 * | 12/2013 | Jeon | | G11C 7/1057 326/26 |
| 8,693,555 | B2 * | 4/2014 | Matsumoto | | H04B 3/548 375/257 |
| 8,817,184 | B1 * | 8/2014 | Amirkhany | | H04N 5/04 348/194 |
| 9,013,380 | B2 * | 4/2015 | Seo | | G09G 3/3208 341/50 |
| 9,013,390 | B2 * | 4/2015 | Yang | | G09G 3/3677 345/100 |
| 9,024,857 | B2 * | 5/2015 | Ahn | | G11C 19/28 345/100 |
| 9,035,922 | B2 * | 5/2015 | Kim | | G09G 3/3674 345/204 |
| 9,099,039 | B2 * | 8/2015 | Kim | | G09G 3/3233 |
| 9,130,557 | B2 * | 9/2015 | Cho | | H03K 19/0005 |
| 2001/0009531 | A1 * | 7/2001 | Farmwald | | G06F 12/0215 365/233.1 |
| 2002/0150116 | A1 * | 10/2002 | Huang | | H04B 3/548 370/431 |
| 2004/0263204 | A1 * | 12/2004 | Chandler | | H03K 19/0005 326/30 |
| 2005/0040846 | A1 * | 2/2005 | Otsuka | | H04L 25/08 326/31 |
| 2005/0160208 | A1 * | 7/2005 | Hampel | | G06F 13/37 710/117 |
| 2005/0204057 | A1 * | 9/2005 | Anderson | | H04L 29/06027 709/236 |
| 2006/0267633 | A1 * | 11/2006 | King | | H03K 19/01858 326/83 |
| 2007/0073981 | A1 * | 3/2007 | Im | | G11C 7/1075 711/149 |
| 2008/0136493 | A1 * | 6/2008 | Sumita | | H03K 17/04123 327/374 |
| 2008/0150852 | A1 * | 6/2008 | Edwards | | G09G 3/3648 345/87 |
| 2008/0250175 | A1 * | 10/2008 | Sheafor | | G06F 13/4286 710/100 |
| 2008/0309597 | A1 * | 12/2008 | Nam | | G09G 3/3677 345/87 |
| 2009/0085631 | A1 * | 4/2009 | Lambrecht | | G06F 13/4291 327/299 |
| 2010/0026669 | A1 * | 2/2010 | Lee | | G11C 19/28 345/204 |
| 2010/0073332 | A1 * | 3/2010 | Gettemy | | G02F 1/13452 345/204 |
| 2010/0102512 | A1 * | 4/2010 | Dar | | F41J 9/18 273/362 |
| 2010/0225621 | A1 * | 9/2010 | Jung | | G09G 3/3677 345/204 |
| 2012/0056858 | A1 * | 3/2012 | Ahn | | G11C 19/28 345/204 |
| 2012/0068618 | A1 * | 3/2012 | Koski | | H05B 33/0851 315/240 |
| 2012/0235973 | A1 * | 9/2012 | Yoo | | G09G 3/3233 345/211 |
| 2013/0036335 | A1 * | 2/2013 | Kim | | G09G 3/006 714/704 |
| 2014/0070862 | A1 * | 3/2014 | Palmer | | H03K 5/131 327/263 |
| 2014/0372644 | A1 * | 12/2014 | Sengoku | | G06F 13/4291 710/106 |
| 2015/0074306 | A1 * | 3/2015 | Ayyagari | | G06F 13/4295 710/110 |
| 2015/0207317 | A1 * | 7/2015 | Radermacher | | H02J 1/06 307/4 |

* cited by examiner

METHOD OF STARTUP SEQUENCE FOR A PANEL INTERFACE

CROSS-REFERENCE TO RELATED APPLICATION(S)

The present application claims priority to and the benefit of U.S. Provisional Application No. 62/041530, filed Aug. 25, 2014, entitled "METHOD OF STARTUP SEQUENCE FOR A PANEL INTERFACE", the entire content of which is incorporated herein by reference.

BACKGROUND

1. Field

One or more aspects of embodiments according to the present invention relate to serial communication links, and more particularly to a system and method for reliably starting a point-to-multi-point link.

2. Description of Related Art

A video display, e.g., an organic light-emitting diode (OLED) display or a liquid crystal display (LCD) may include drive electronics including a timing controller (TCON) and a plurality of driver integrated circuits (DICs). Each DIC may be responsible for controlling a portion of the display. The TCON may send data to each DIC, including video data defining the image to be displayed on the portion of the display for which the DIC is responsible. The data links from the TCON to the DICs may be high-speed serial links, forming a point-to-multi-point serial communications system including a multiple-output transmitter in the TCON and a receiver in each of the DICs.

The serial links may require a multi-state startup procedure to begin operation after power-up. For example, after power-up, the TCON may initially transmit a clock pattern on each serial data lane, to allow clock and data recovery (CDR) blocks in the DICs to be initialized. Once all of the PLLs are initialized, the TCON may begin to transmit data to the DICs. The time required for initialization of a CDR may vary depending on its initial state. The TCON may therefore transmit the clock pattern for an interval of time that is relatively long, to provide a high-likelihood that all DIC CDRs will be initialized when the TCON transitions to transmitting data, so that the display may start reliably. This approach results in a relatively slow start-up.

Thus, there is a need for a system and method for starting a point-to-multi-point serial communications system quickly and reliably.

SUMMARY

Aspects of embodiments of the present disclosure are directed toward a system and method for starting a point-to-multi-point serial communications system reliably, when the startup sequence involves training clock and data recovery circuits in the receiver with a training waveform sent for this purpose by the transmitter. In one embodiment, a sync lane is used to communicate state information between the transmitter and the receivers, with the transmitter pulling the sync lane up when it is ready for the next state change, and each receiver pulling the sync lane down until it is ready for the state change.

According to an embodiment of the present invention there is provided a system including: a transmitter having a sync connection and a plurality of data outputs; and a plurality of receivers, each of the plurality of receiver having a sync connection and a data input, the data input of each of the plurality of receivers being connected to a respective one of the plurality of data outputs of the transmitter, the sync connection of the transmitter being connected, by a sync conductor, to the sync connection of each of the plurality of receivers, the sync conductor being configured to be in a ready state when not pulled to a not ready state by the transmitter or by one of the plurality of receivers, and each of the receivers being configured to: pull the sync conductor to a not ready state while performing an initialization process; release the sync conductor when the initialization process is complete, and perform a state transition when the sync conductor transitions from the not ready state to the ready state.

In one embodiment, the transmitter is configured to: transmit a training signal at each of the plurality of data outputs; release the sync conductor; wait for the sync conductor to transition to the ready state; and transmit data at each of the plurality of data outputs.

In one embodiment, the transmitter is further configured to, before transmitting a training signal at each of the plurality of data outputs: pull the sync conductor to the not ready state.

In one embodiment, the transmitter is further configured to, after pulling the sync conductor to the not ready state, and before transmitting a training signal at each of the plurality of data outputs: complete a transmitter initialization process.

In one embodiment, a receiver of the plurality of receivers includes a clock and data recovery (CDR) circuit connected to the data input of the receiver, the CDR having a training mode, a hold mode, and a tracking mode, and wherein the receiver is configured to: pull the sync conductor to the not ready state a first time; complete a receiver initialization process; release the sync conductor a first time; wait a first time for the sync conductor to transition to the ready state; transition to a CDR training mode; pull the sync conductor to a not ready state a second time; wait for the CDR to complete the training mode; release the sync conductor a second time; wait a second time for the sync conductor to transition to the ready state; and transition to a CDR tracking mode.

In one embodiment, the receiver is further configured, after waiting for the CDR to complete the training mode and before releasing the sync conductor a second time, to transition to a CDR hold mode.

In one embodiment, the receiver is further configured: after waiting a first time for the sync conductor to transition to the ready state and before transitioning to the CDR training mode, to wait a first time interval.

In one embodiment, the receiver is further configured: after waiting a second time for the sync conductor to transition to the ready state and before transitioning the to the CDR tracking mode, to wait a second time interval.

In one embodiment, the transmitter is configured to: transmit a training signal at each of the plurality of data outputs; pull the sync conductor toward the ready state; wait for the sync conductor to transition to the ready state; and transmit data at each of the plurality of data outputs.

In one embodiment, the transmitter is further configured to, before transmitting a training signal at each of the plurality of data outputs: pull the sync conductor to the not ready state.

In one embodiment, the transmitter is further configured to, after pulling the sync conductor to the not ready state, and before transmitting a training signal at each of the plurality of data outputs: complete a transmitter initialization process.

In one embodiment, a receiver of the plurality of receivers includes a clock and data recovery (CDR) circuit connected to the data input of the receiver, the CDR having a training mode, a hold mode, and a tracking mode, and wherein the receiver is configured to: pull the sync conductor to the not ready state a first time; complete a receiver initialization process; release the sync conductor a first time; wait a first time for the sync conductor to transition to the ready state; transition to a CDR training mode; pull the sync conductor to a not ready state a second time; wait for the CDR to complete the training mode; release the sync conductor a second time; wait a second time for the sync conductor to transition to the ready state; and transition to a CDR tracking mode.

In one embodiment, the receiver is further configured, after waiting for the CDR to complete the training mode and before releasing the sync conductor a second time, to transition to a CDR hold mode.

In one embodiment, the receiver is further configured: after waiting a first time for the sync conductor to transition to the ready state and before transitioning to the CDR training mode, to wait a first time interval.

In one embodiment, the receiver is further configured: after waiting a second time for the sync conductor to transition to the ready state and before transitioning the to the CDR tracking mode, to wait a second time interval.

According to an embodiment of the present invention there is provided a system including: a transmitter having a sync connection and a plurality of data outputs; and a plurality of receivers, each of the plurality of receiver having a sync connection and a data input; the data input of each of the plurality of receivers being connected to a respective one of the plurality of data outputs of the transmitter; and the sync connection of the transmitter being connected to the sync connection of each of the plurality of receivers, each of the plurality of receivers including a first resistor and a first transistor, the first resistor and the first transistor being configured to establish, when the first transistor is turned on, a current path between the sync connection of the receiver and a first voltage source in the receiver, and the transmitter including a second resistor and a second transistor, the second resistor and the second transistor configured to establish, when the second transistor is turned on, a current path between the sync connection of the transmitter and a second voltage source in the transmitter.

In one embodiment, the transmitter is configured to: transmit a training signal at each of the plurality of data outputs; wait for the sync connection of the transmitter to transition to high; and transmit data at each of the plurality of data outputs.

In one embodiment, the transmitter is configured to, before transmitting a training signal at each of the plurality of data outputs: pull the sync connection of the transmitter down.

In one embodiment, the transmitter is further configured, after pulling the sync connection of the transmitter down, and before transmitting a training signal at each of the plurality of data outputs, to: pull the sync connection of the transmitter up; and wait for the sync connection of the transmitter to transition to high.

According to an embodiment of the present invention there is provided a display including: a display panel; a plurality of driver integrated circuits connected to the display panel, each of the plurality of driver integrated circuits including a respective receiver of a plurality of receivers, each of the plurality of receiver having a sync connection and a data input; a timing controller including a transmitter having a sync connection and a plurality of data outputs, the data input of each of the plurality of receivers being connected to a respective one of the plurality of data outputs of the transmitter, the sync connection of the transmitter being connected, by a sync conductor, to the sync connection of each of the plurality of receivers, the sync conductor being configured to be in a ready state when not pulled to a not ready state by the transmitter or by one of the plurality of receivers, and each of the receivers being configured to: pull the sync conductor to a not ready state while performing an initialization process; release the sync conductor when the initialization process is complete, and perform a state transition when the sync conductor transitions from the not ready state to the ready state.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a method of startup sequence for a panel interface provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
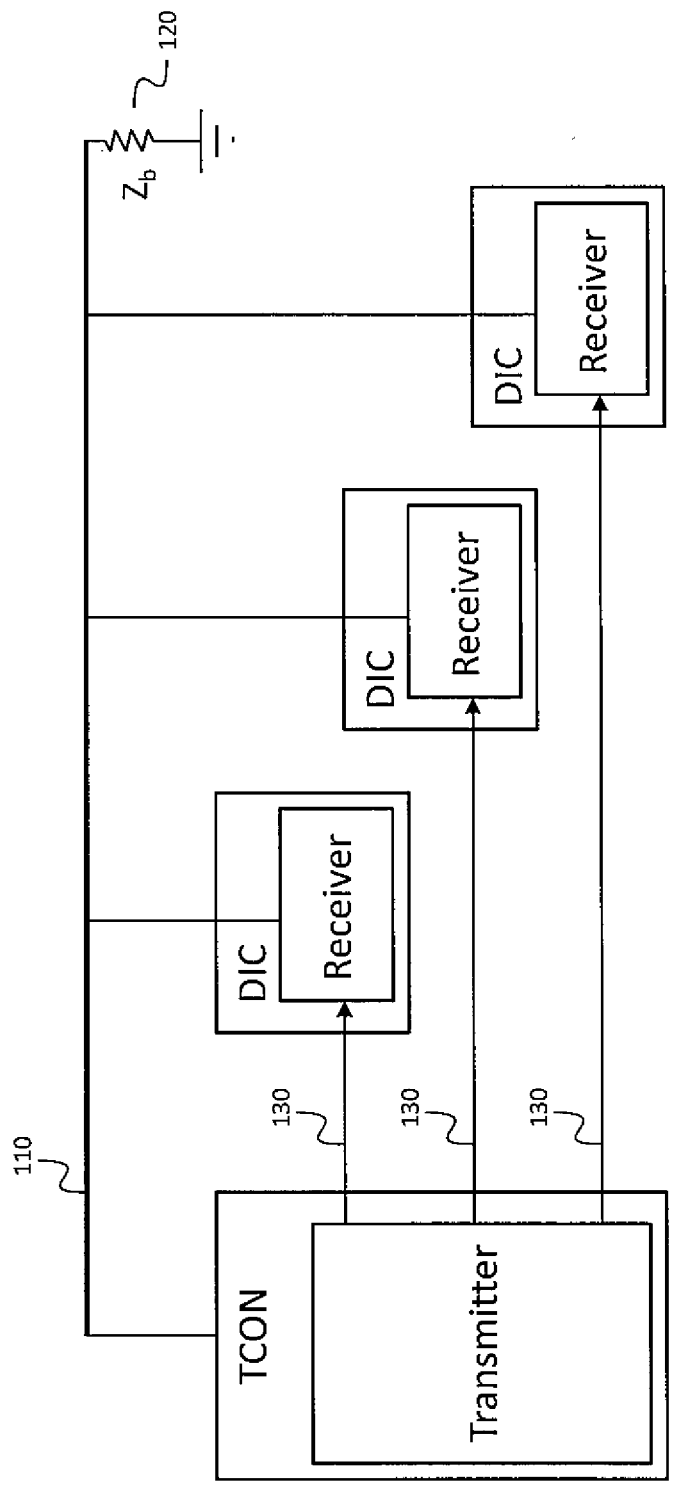
FIG. 1 is a block diagram of a point-to-multi-point serial communications system according to an embodiment of the present invention.

Referring to FIG. 1, in one embodiment a TCON includes a transmitter with several serial outputs, each connected to a respective receiver in a DIC. Only three DICs are shown, schematically, in FIG. 1; in some embodiments a larger number of DICs may be used. A serial data lane 130 connects each transmitter data output to each receiver data input. Each receiver may have, connected to its data input, a clock and data recovery (CDR) circuit, which may include a phase locked loop (PLL). At startup the transmitter may transmit a clock signal on each of the serial data lanes 130 for a period of time, and each receiver may use this clock signal to set the frequency of the PLL, by, in a CDR training mode, locking the PLL to the received clock signal. After the PLL clock frequency of each receiver is set, each receiver CDR circuit may transition to a CDR tracking mode, the transmitter may begin to transmit serial data on the serial data lanes 130, and the CDR circuits of the receivers may, in a CDR tracking mode, track transitions in the data (i.e., track an "embedded clock" corresponding to transitions in the data). For proper execution, state transitions in the transmitter and in the receivers may occur in a particular order. For example, the transition to CDR training mode in the receivers may occur only after the transmitter begins transmitting a clock signal on each of the serial data lanes 130, and the transmitter may begin to transmit non-clock serial data (i.e., data other than the CDR training pattern) on each of the serial data lanes 130 only after the PLL has locked in each of the receivers. In some embodiments, each receiver transitions from CDR training mode to CDR hold mode after the PLL has locked, and then transitions to CDR tracking mode after the transmitter has begun to transmit serial data. In such an embodiment, proper execution may be achieved if the transmitter begins to transmit serial data only after all of the receivers have transitioned to CDR hold mode.

A synchronization or "sync" signaling lane also connects the TCON to the DICs; this lane may be used to send a sync signal periodically to the DICs during operation. The sync signaling lane 110 or "sync conductor" may be a conductor such as a transmission line configured to feed a sync signal to each of the DIC receivers. The sync signaling lane 110 may be arranged in a "fly-by" configuration, i.e., the output impedance of the TCON terminal driving one end of the sync signaling lane 110 may be matched to the characteristic impedance of the sync signaling lane 110, an on-board termination 120 at the other end of the sync signaling lane 110 may include (e.g., consist of) a resistor connected to ground, the resistor having a resistance $Z_b$ substantially equal to the characteristic impedance of the sync signaling lane 110, and each of the receiver inputs receiving the sync signal may be high-impedance inputs connected to the sync signaling lane 110 by short traces. As used herein, a "fly-by" configuration refers to a configuration in which a transmission line passes near several receivers, each of which is connected to the transmission line with a stub, the impedance and length of each stub, as well as the distance between the drops, being designed to minimize reflections for all receivers.

Figure 2:
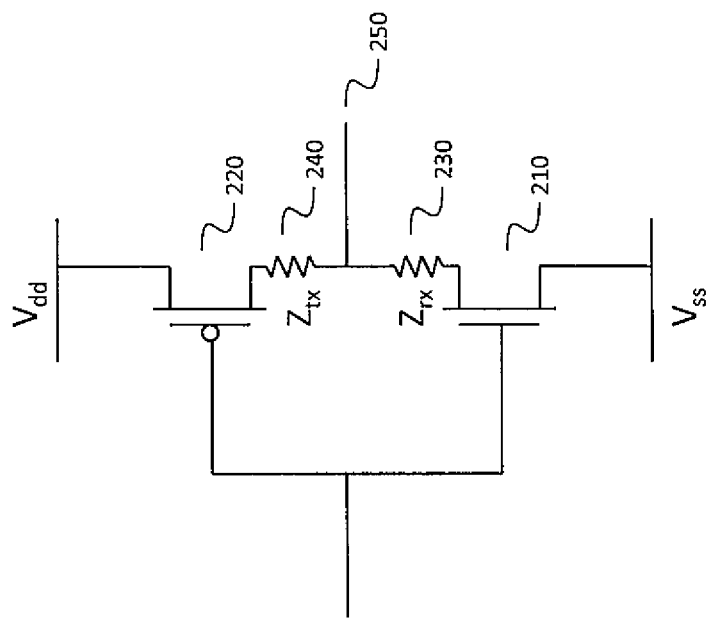
FIG. 2 is a schematic diagram of a circuit in a transmitter, connected to a sync connection, according to an embodiment of the present invention.

In one embodiment, the sync signaling lane 110 is also used to communicate state information during startup. The sync signal drive circuit in the TCON transmitter may be configured to either pull up the sync signaling lane 110 with an output impedance of $Z_{tx}$ or pull down the sync signaling lane 110, with an output impedance of $Z_{rx}$ Referring to FIG. 2, the sync signal drive circuit in the TCON transmitter may include, for example a circuit that is a complementary metal oxide semiconductor (CMOS) inverter including an n-channel metal-oxide semiconductor (NMOS) transistor 210, a p-channel metal-oxide semiconductor (PMOS) transistor 220, and first and second output resistors (or "impedances") 230, 240, connected to the output of the sync signal drive circuit. The sources of the transistors 210, 220 may be connected to voltage supplies at voltages of $V_{ss}$ and $V_{dd}$ respectively, which may, for example, be ground and a positive supply voltage respectively. The impedances $Z_{rx}$ and $Z_{tx}$ may be the resistors 230, 240, if on-resistance of the transistors 210, 220 is negligible; otherwise $Z_{rx}$ and $Z_{tx}$ may respectively be the sums of the output resistors (or "impedances") 230, 240 and the on-resistances of the transistors 210, 220. If the load on the sync signaling lane 110 from all of the DIC receivers is small, and if $Z_{tx}=Z_b$, then when the transmitter output pulls the sync signaling lane 110 up, it is at a voltage of $V_{swing}=\frac{1}{2} V_{dd}$; $V_{swing}$ may be referred to as a "high" level. In the circuit of FIG. 2, the transistors 210, 220 may act as switches. The output 250 of the circuit of FIG. 2 may be connected, e.g., directly connected, to the sync signaling lane 110.

In other embodiments, the NMOS transistor 210 and the first output resistor 230 is omitted, and the sync signal drive circuit in the transmitter includes only the PMOS transistor 220 in series with the resistor 240, the series combination being connected between $V_{dd}$ and the output 250 of the circuit, which is connected, e.g., directly connected, to the sync signaling lane 110. The transistor then acts as a switch that establishes; when the PMOS transistor 220 is turned on (i.e., when the switch is closed) a current path between the sync connection of the transmitter and a voltage source in the transmitter (e.g., $V_{dd}$). In this embodiment, the transmitter pulls the sync signaling lane 110 up when the PMOS transistor 220 is turned on, and the on-board termination 120 pulls the sync signaling lane 110 down when the PMOS transistor 220 is turned off.

As used herein, a first circuit may be said to "pull down" a conductor such as the sync signaling lane 110 when the first circuit establishes a current path between the conductor and a first voltage source, and when one or more other circuits connected to the conductor establish one or more current paths, or may be switched on to establish one or more current paths, to a second voltage source at a higher voltage than the first voltage source. Similarly, if a second circuit establishes a current path between the conductor and a voltage source at a higher voltage than the first voltage source, the second circuit may be said to "pull up" the conductor. For example, in a circuit with a first voltage source at 0 V (i.e., ground) and a second voltage source at 3.3 V, if a conductor is connected only to the 3.3 V voltage source (e.g., through a resistor), it will be pulled up to 3.3 V. If a second resistor is then connected between the conductor and ground, then the second resistor will pull the conductor down (to a voltage between 0 V and 3.3 V).

Figure 3:
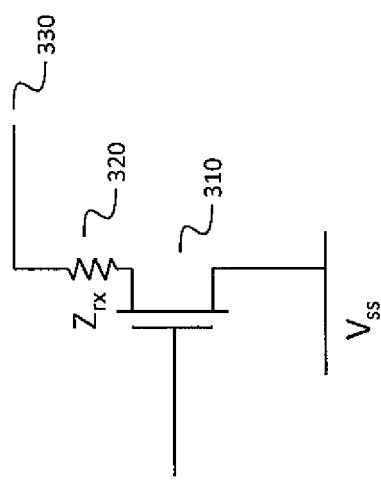
FIG. 3 is a schematic diagram of a circuit in a receiver, connected to a sync connection, according to an embodiment of the present invention.

Each of the receivers may include a circuit connected to the sync signaling lane 110, the circuit being configured to pull the sync signaling lane 110 down, or to release it. For example, each receiver may include a circuit like the one illustrated in FIG. 3, including an NMOS transistor 310, and an output resistor 320, connected to an output 330 which is connected, e.g., directly connected, to the sync signaling lane 110. The NMOS transistor 310 may act as a switch that establishes, when the NMOS transistor 310 is turned on (i.e., when the switch is closed) a current path between the sync connection of the receiver and a voltage source in the receiver (e.g., $V_{ss}$). Thus, each receiver may, at any point in time, pull the sync signaling lane 110 down (if the transistor 310 is turned on) or release the sync signaling lane 110 (if the transistor 310 is turned off).

As mentioned above, if the transmitter is pulling the sync signaling lane 110 up, and all of the receivers have released the sync signaling lane 110, then the sync signaling lane 110 will be high (i.e., at a voltage $V_{swing}$ corresponding to a high level). If, on the other hand, either (i) the transmitter is pulling the sync signaling lane 110 down, or (ii) any of the receivers is pulling the sync signaling lane 110 down, then the sync signaling lane 110 will be at a voltage less than the voltage $V_{swing}$ corresponding to a high level. These states, in which the sync signaling lane 110 is at a voltage less than the voltage $V_{swing}$ corresponding to a high level, are collectively referred to herein as "not high". In the "not high" state, the voltage on the sync signaling lane 110 may range from $V_{ss}$ (if the transmitter is pulling the sync signaling lane 110 down) to a higher value less than $V_{swing}$ (if transmitter is pulling the sync signaling lane 110 up, and one of the receivers is pulling the sync signaling lane 110 down). In one embodiment, the transmitter includes a comparator with an input connected to the sync signaling lane 110 and another input connected to a reference or "threshold" voltage $V_{th}$, and the output of the comparator is used, in the transmitter, as an indication of whether the sync signaling lane 110 is high (if the voltage on sync signaling lane 110 exceeds $V_{th}$) or not high (if the voltage on sync signaling lane 110 is less than $V_{th}$). Each of the receivers may similarly include a comparator with an input connected to the sync signaling lane 110 to detect whether the sync signaling lane 110 is high or not high. In one embodiment, $V_{th}$ is 2 $V_{swing}/3$, and $Z_{rx}$ and $Z_{tx}$ are selected so that (i) the voltage on the sync signaling lane 110 corresponds to a high level when the transmitter pulls the sync signaling lane 110 up and all of the receivers have released the sync signaling lane 110, and (ii) the voltage on the sync signaling lane 110 corresponds to a not high level when the transmitter pulls the sync signaling lane 110 down or any of the receivers pulls the sync signaling lane 110 down.

In some embodiments, the transmitter may be configured, like the receivers, to either pull the sync signaling lane 110 down or to release it (i.e., it may not be configured to pull the signaling lane 110 up) and an external pull-up resistor (e.g., installed near the transmitter) may pull the signaling lane 110 to the high state when the transmitter, and all of the receivers, have released the sync signaling lane 110. In some embodiments, the system ensures that the transmitter is powered on before any of the receivers to insure that transmitter initialization is complete before receiver initialization is complete for any receiver, and the transmitter is not configured to pull down the sync signaling lane 110, but is configured to pull it up at all times, or to release it at all times (and an external resistor may pull it up).

Figure 4:
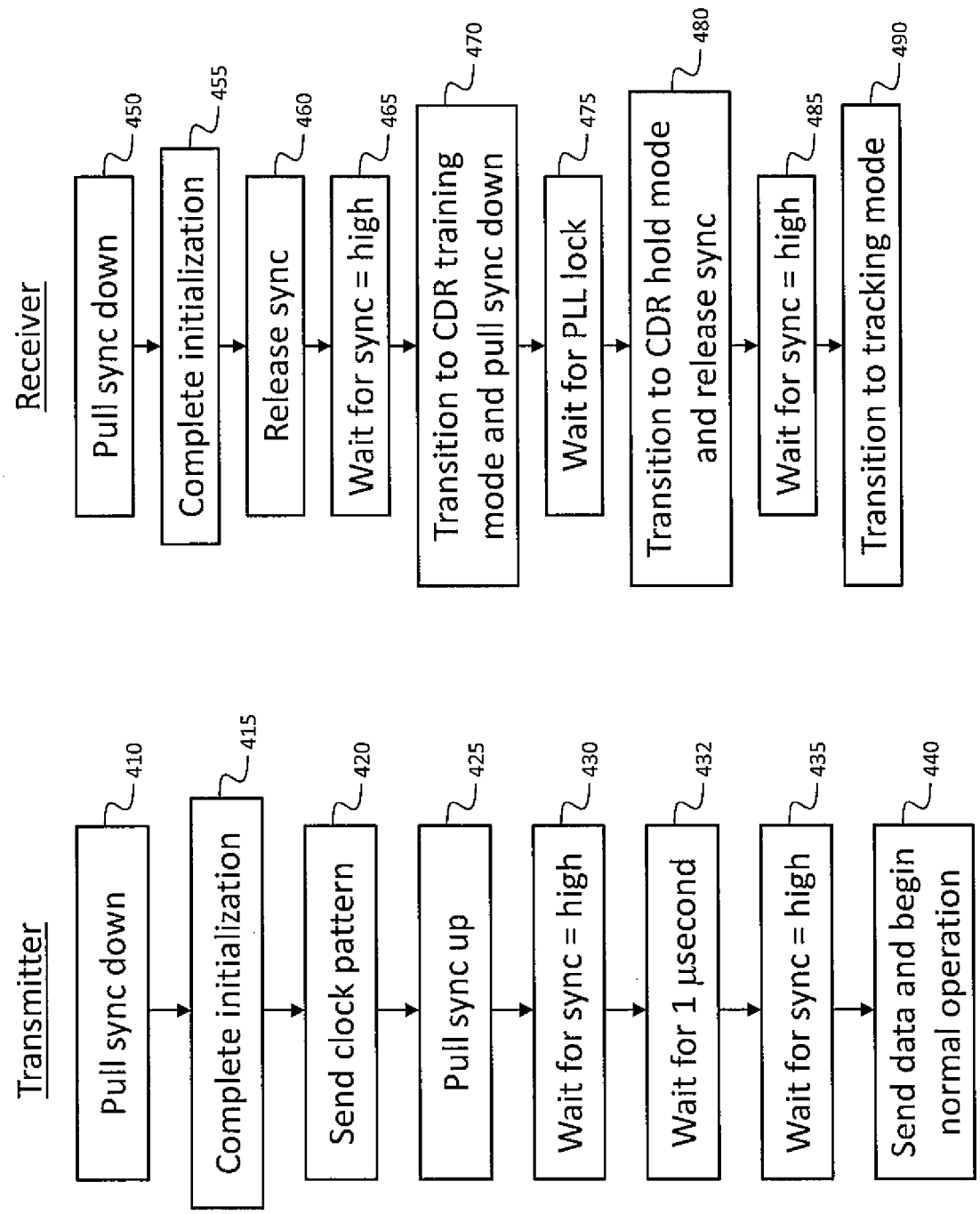
FIG. 4 shows two parallel flow charts showing state changes in a transmitter and a receiver according to an embodiment of the present invention.

As mentioned above, the sync signaling lane 110 may be used for communicating state information between the transmitter and the receivers during startup. Referring to FIG. 4, in one embodiment, the transmitter, in an act 410, pulls the sync signaling lane 110 down, then, in an act 415, completes initialization. The transmitter then begins, in an act 420, transmitting a training signal such as a clock pattern on each of the serial data lanes 130, and pulls the sync signaling lane 110 up, in an act 425. It then waits, in an act 430, for the sync signaling lane 110 to transition to high.

The right hand side of FIG. 4 shows the sequence executed, in one embodiment, by one of the receivers. The receiver pulls the sync signaling lane 110 down, in an act 450, during initialization. After it completes initialization in an act 455, the receiver releases the sync signaling lane 110, in an act 460, when it is ready to transition to clock and data recovery circuit (CDR) training mode. It then waits, in an act 465, for the sync signaling lane 110 to transition to high, which occurs only when all of the other receivers have also released the sync signaling lane 110.

The sync signaling lane 110 level thus transitions to high (from not high) when the transmitter is ready to begin sending a clock signal on the serial data lanes 130, and when all of the receivers are ready to transition to CDR training mode. When the sync signaling lane 110 transitions to high, the receiver transitions, in an act 470, to CDR training mode, and pulls the sync signaling lane 110 down. When the sync signaling lane 110 transitions to high, the transmitter waits for 1 microsecond (in an act 432), during which time one or more of the receivers again pulls the sync signaling lane 110 down. The transmitter then waits, in an act 435, for the sync signaling lane 110 to transition to high.

In CDR training mode, the receiver may execute a process for initializing the frequency of the PLL in the CDR circuit, using the training signal on the serial data lanes 130 as a frequency reference. In one embodiment, the receiver waits a first time interval, e.g., 1 microsecond, after it detects that the sync signaling lane 110 is high, before transitioning to CDR training mode. This first time interval may be selected to be longer than the time of flight between any pair of elements in the point-to-multi-point serial communications system, i.e., longer than the time of flight between the transmitter and any of the receivers, and longer than the time of flight between any pair of receivers. This delay avoids the possibility that one receiver may respond immediately to the sync signaling lane 110 transitioning to high, change states, and then change to a subsequent state in which it again pulls the sync signaling lane 110 down, before another of the receivers has received, and changed states in response to, the high level on the sync signaling lane 110.

The receiver waits (in CDR training mode), in an act 475, for its PLL to lock. The receiver may include a circuit that detects when the frequency of the PLL has been initialized (i.e., when the PLL is locked); once PLL lock is detected, the receiver may, in an act 480, transition to a CDR hold mode, and release the sync signaling lane 110. The receiver then waits, in an act 485, for the sync signaling lane 110 to transition to high (indicating that the PLLs in all of the other receivers have locked, and that the system is ready to transition to the next state). In the CDR hold mode, the PLL may operate open-loop, i.e., maintaining the frequency of the PLL substantially constant. In one embodiment, the PLL includes a voltage-controlled oscillator, and in CDR hold mode, the control input of the voltage controlled oscillator is connected to a capacitor that stores a voltage corresponding to the frequency to which the VCO was set at the conclusion of the CDR training mode.

In one embodiment, once the PLL in each of the receivers has locked and each receiver has transitioned to CDR hold mode, each receiver will have released the sync signaling lane 110 and the sync signaling lane 110 transitions to the high level.

When the receivers detect that the sync signaling lane 110 is high, each receiver waits a second time interval and transitions, in an act 490, to CDR tracking mode. The second time interval may be selected to be longer than the time of flight between any pair of elements in the point-to-multi-point serial communications system. In one embodiment the second time interval is 1 microsecond. In CDR tracking mode the CDR uses embedded clock recovery to control the frequency and phase of a local clock signal used to clock a slicer (or clocked comparator) at the data input of the receiver.

When the transmitter detects that the sync signaling lane 110 is high, it may begin, in an act 440, transmitting serial data (i.e., video data) to the receivers. The transmitter may also, after a third time interval, e.g., 10 microseconds, pull the sync signaling lane 110 down, to begin normal operation of the sync signal. In normal operation, the sync signal is low except for a short pulse at the beginning of each frame during which it is high, the rising edge of which signals the start of a frame.

Acts 480 and 485 may be optional, and in some embodiments, the receiver transitions directly to tracking mode once the PLL has locked. The receiver then tracks the training signal for as long as the training signal continues to be transmitted, and, once the transmitter begins to transmit data, the receiver begins to track the data signal.

Although in embodiments described herein the sync signaling lane 110 is described as being pulled up, or pulled down, and as being in a high state or a not high state, the function of synchronizing the startup sequence may be implemented otherwise, with, for example a low state (instead of a high state) indicating that the transmitter and all of the receivers are ready to transition to a next state. The state of the sync signaling lane 110 (or "sync conductor") when all of the devices connected to it are ready to transition to a next state may therefore be referred to more generally as a "ready" state, and the state when at least one device connected to it is not ready to transition to a next state may be referred to as a "not ready" state. Thus, for example, the high state may be the ready state and the not high state may be the not ready state. In this terminology, the receivers may be said to pull the sync signaling lane 110 to the not ready state or to release the sync signaling lane 110. In some embodiments the transmitter may be said to either pull the sync signaling lane 110 to the not ready state or to pull the sync signaling lane 110 toward the ready state (which may correspond pulling the sync signaling lane 110 up, with the result that it will go high (i.e., to the ready state) if released by all the receivers). In another embodiment (e.g., one with an external pull-up resistor), the transmitter may be said to either pull the sync signaling lane 110 to the not ready state or to release the sync signaling lane 110.

Although in some embodiments described herein, the sync signal is bidirectional, in other embodiments, two unidirectional sync signals may be used, e.g. a unidirectional SYNC_FORWARD and a unidirectional SYNC_BACK. The transmitter may drive SYNC_FORWARD and each receiver may sense or detect the level on the SYNC_FORWARD, while each receiver may drive SYNC_BACK and the transmitter may sense the level on SYNC_BACK. The SYNC_FORWARD signal may be terminated to ground on the board at the receiver side, and the SYNC_BACK signal may be terminated to $V_{dd}$ on the board on the transmitter side.

Figure 5:
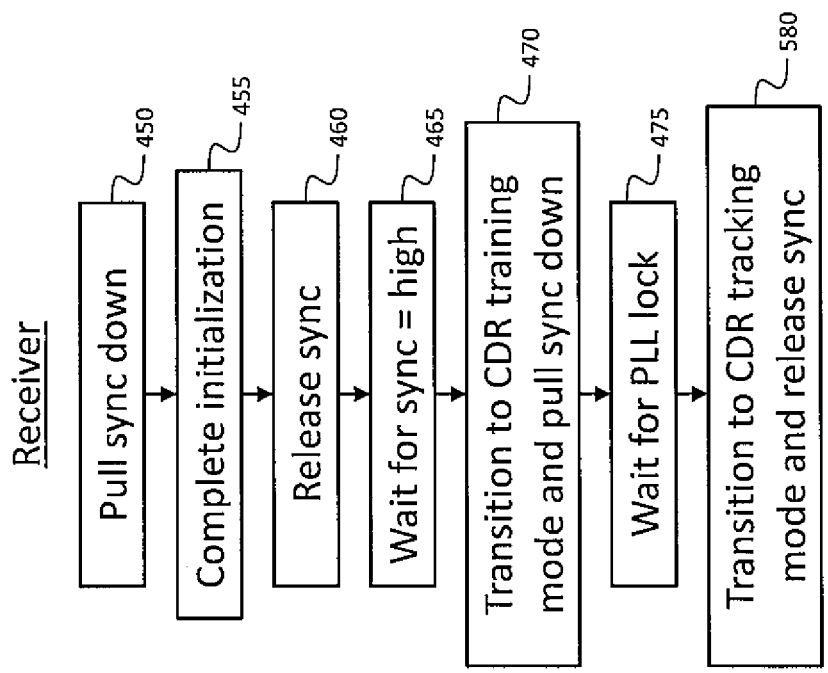
FIG. 5 shows a flow chart showing state changes in a receiver according to another embodiment of the present invention.

Referring to FIG. 5, in one embodiment, each receiver, upon detecting PLL lock, releases the sync signaling lane 110 and transitions, in an act 580, directly to CDR tracking mode, instead of first transitioning to CDR hold mode until a high level is detected in the sync signaling lane 110. The receiver may, in this embodiment, continue to receive the clock signal on its respective serial data lane 130. The CDR circuit may track this clock signal until the sync signaling lane 110 transitions to high, and the transmitter begins to transmit data, at which point the CDR circuit will track the data signal and the receiver will begin to receive the transmitted data.

Figure 6:
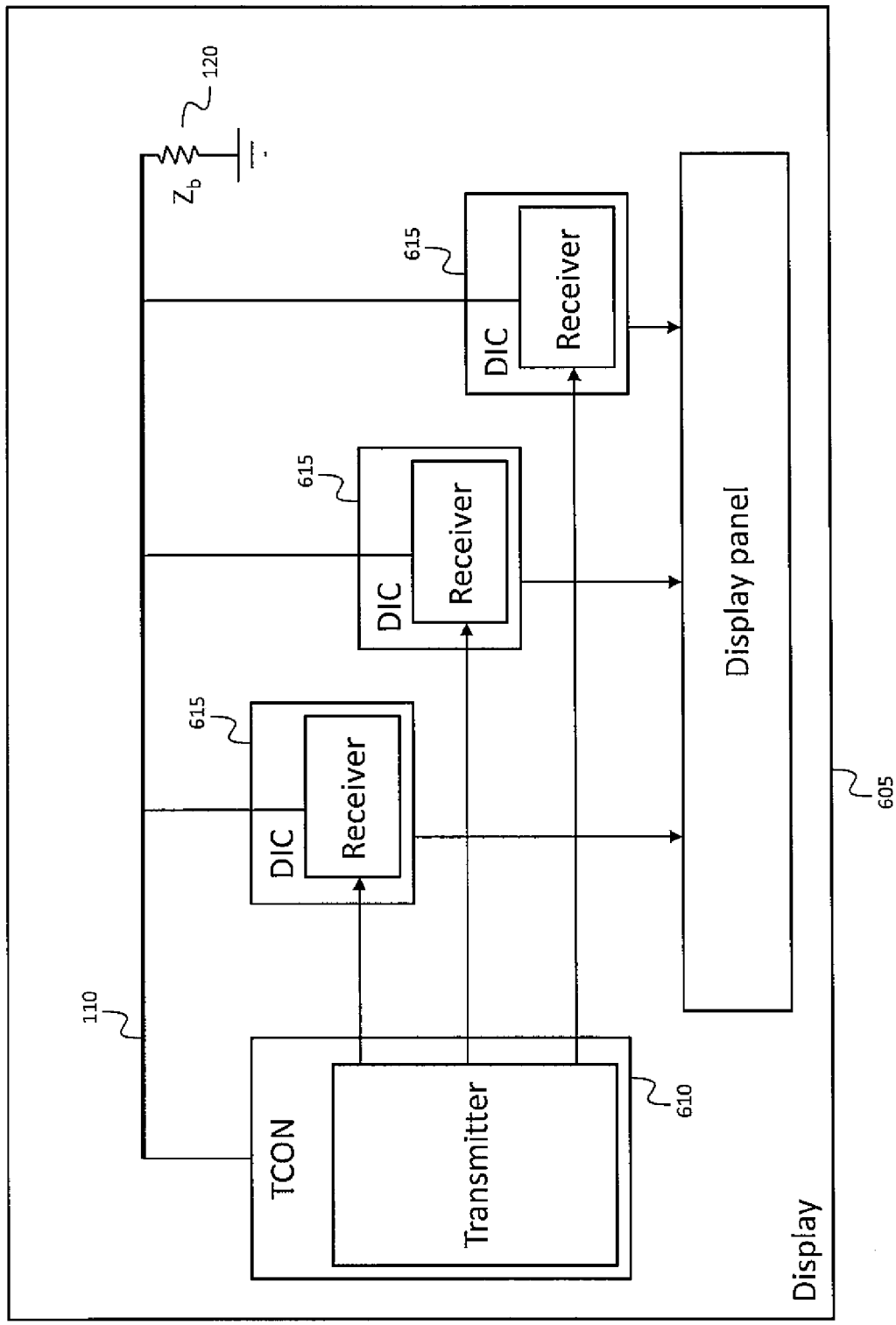
FIG. 6 is a block diagram of a display according to an embodiment of the present invention.

Referring to FIG. 6, in one embodiment, a display 605 contains a timing controller 610 configured to send high-speed serial data to each of a plurality of driver integrated circuits (DICs) 615, each of which controls a portion of a display panel. The timing controller 610 and the DICs 615 communicate via a sync signaling lane 110 during an initialization process at power-up. Here, in embodiments of the present invention, the display is an organic light emitting diode (OLED) display or a liquid crystal display (LCD), and accordingly contains an OLED display panel or an LCD panel.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

The display and/or any other relevant devices or components according to embodiments of the present invention described herein may be implemented utilizing any suitable hardware, firmware (e.g. an application-specific integrated circuit), software, or a combination of software, firmware, and hardware. For example, the various components of the display may be formed on one integrated circuit (IC) chip or on separate IC chips. Further, the various components of the display may be implemented on a flexible printed circuit film, a tape carrier package (TCP), a printed circuit board (PCB), or formed on one substrate. Further, the various components of the display may be may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Although limited embodiments of a method of startup sequence for a panel interface have been specifically described and illustrated herein, many modifications and variations will be apparent to those skilled in the art. For example, although in the embodiments described above, the sync signaling lane 110 operates as a single ended signal, as one of skill in the art will appreciate, in other embodiments the sync signaling lane may be a differential signal including two conductors, operating in a first ("high") state in which a first conductor is high and the complementary conductor is low, and in set of second states, collectively referred to as "not high" in which the first conductor is not high and the the complementary conductor is not low. Accordingly, it is to be understood that a method of startup sequence for a panel interface employed according to principles of this invention may be embodied other than as specifically described herein. The invention is also defined in the following claims, and equivalents thereof.

What is claimed is:

1. A system comprising:
   a transmitter having a sync connection and a plurality of data outputs; and
   a plurality of receivers, each of the plurality of receiver having a sync connection and a data input,
   the data input of each of the plurality of receivers being connected to a respective one of the plurality of data outputs of the transmitter,
   the sync connection of the transmitter being connected, by a sync conductor, to the sync connection of each of the plurality of receivers,
   the sync conductor being configured to be in a ready state when not pulled to a not ready state by the transmitter or by one of the plurality of receivers, and
   each of the receivers being configured to:
      pull the sync conductor to a not ready state while performing an initialization process;
      release the sync conductor when the initialization process is complete, and
      perform a state transition when the sync conductor transitions from the not ready state to the ready state.

2. The system of claim 1, wherein the transmitter is configured to:
   first, transmit a training signal at each of the plurality of data outputs;
   second, release the sync conductor;
   third, wait for the sync conductor to transition to the ready state; and
   fourth, transmit data at each of the plurality of data outputs.

3. The system of claim 2, wherein the transmitter is further configured to,
   before transmitting a training signal at each of the plurality of data outputs:
   pull the sync conductor to the not ready state.

4. The system of claim 3, wherein the transmitter is further configured to,
   after pulling the sync conductor to the not ready state, and
   before transmitting a training signal at each of the plurality of data outputs:
   complete a transmitter initialization process.

5. The system of claim 1,
   wherein a receiver of the plurality of receivers comprises a clock and data recovery (CDR) circuit connected to the data input of the receiver, the CDR having a training mode, a hold mode, and a tracking mode, and
   wherein the receiver is configured to:
      first, pull the sync conductor to the not ready state a first time;
      second, complete a receiver initialization process;
      third, release the sync conductor a first time;
      fourth, wait a first time for the sync conductor to transition to the ready state;
      fifth, transition to a CDR training mode, and pull the sync conductor to a not ready state a second time;
      sixth, wait for the CDR to complete the training mode;
      seventh, release the sync conductor a second time;
      eighth, wait a second time for the sync conductor to transition to the ready state; and
      ninth, transition to a CDR tracking mode.

6. The system of claim 5, wherein the receiver is further configured,
   after waiting for the CDR to complete the training mode and before releasing the sync conductor a second time, to transition to a CDR hold mode.

7. The system of claim 5, wherein the receiver is further configured:
   after waiting a first time for the sync conductor to transition to the ready state and before transitioning to the CDR training mode, to wait a first time interval.

8. The system of claim 7, wherein the receiver is further configured:
   after waiting a second time for the sync conductor to transition to the ready state and before transitioning the to the CDR tracking mode, to wait a second time interval.

9. The system of claim 1, wherein the transmitter is configured to:
   first, transmit a training signal at each of the plurality of data outputs;
   second, pull the sync conductor toward the ready state;
   third, wait for the sync conductor to transition to the ready state; and
   fourth, transmit data at each of the plurality of data outputs.

10. The system of claim 9, wherein the transmitter is further configured to,
before transmitting a training signal at each of the plurality of data outputs:
pull the sync conductor to the not ready state.

11. The system of claim 10, wherein the transmitter is further configured to,
after pulling the sync conductor to the not ready state, and
before transmitting a training signal at each of the plurality of data outputs:
complete a transmitter initialization process.

12. The system of claim 9,
wherein a receiver of the plurality of receivers comprises a clock and data recovery (CDR) circuit connected to the data input of the receiver, the CDR having a training mode, a hold mode, and a tracking mode, and
wherein the receiver is configured to:
first, pull the sync conductor to the not ready state a first time;
second, complete a receiver initialization process;
third, release the sync conductor a first time;
fourth, wait a first time for the sync conductor to transition to the ready state;
fifth, transition to a CDR training mode, and pull the sync conductor to a not ready state a second time;
sixth, wait for the CDR to complete the training mode;
seventh, release the sync conductor a second time;
eighth, wait a second time for the sync conductor to transition to the ready state; and
ninth, transition to a CDR tracking mode.

13. The system of claim 12, wherein the receiver is further configured,
after waiting for the CDR to complete the training mode and before releasing the sync conductor a second time, to transition to a CDR hold mode.

14. The system of claim 12, wherein the receiver is further configured:
after waiting a first time for the sync conductor to transition to the ready state and before transitioning to the CDR training mode, to wait a first time interval.

15. The system of claim 14, wherein the receiver is further configured:
after waiting a second time for the sync conductor to transition to the ready state and before transitioning the to the CDR tracking mode, to wait a second time interval.

16. A system comprising:
a transmitter having a sync connection and a plurality of data outputs; and
a plurality of receivers, each of the plurality of receiver having a sync connection and a data input;
the data input of each of the plurality of receivers being connected to a respective one of the plurality of data outputs of the transmitter; and
the sync connection of the transmitter being connected to the sync connection of each of the plurality of receivers,
each of the plurality of receivers comprising a first resistor and a first transistor, the first resistor and the first transistor being configured to establish, when the first transistor is turned on, a current path between the sync connection of the receiver and a first voltage source in the receiver, and
the transmitter comprising a second resistor and a second transistor, the second resistor and the second transistor configured to establish, when the second transistor is turned on, a current path between the sync connection of the transmitter and a second voltage source in the transmitter.

17. The system of claim 16, wherein the transmitter is configured to:
first, transmit a training signal at each of the plurality of data outputs;
second, wait for the sync connection of the transmitter to transition to high; and
third, transmit data at each of the plurality of data outputs.

18. The system of claim 16, wherein the transmitter is configured to,
before transmitting a training signal at each of the plurality of data outputs: pull the sync connection of the transmitter down.

19. The system of claim 18 wherein the transmitter is further configured,
after pulling the sync connection of the transmitter down, and
before transmitting a training signal at each of the plurality of data outputs, to:
pull the sync connection of the transmitter up; and
wait for the sync connection of the transmitter to transition to high.

20. A display comprising:
a display panel;
a plurality of driver integrated circuits connected to the display panel, each of the plurality of driver integrated circuits comprising a respective receiver of a plurality of receivers, each of the plurality of receiver having a sync connection and a data input;
a timing controller comprising a transmitter having a sync connection and a plurality of data outputs,
the data input of each of the plurality of receivers being connected to a respective one of the plurality of data outputs of the transmitter,
the sync connection of the transmitter being connected, by a sync conductor, to the sync connection of each of the plurality of receivers,
the sync conductor being configured to be in a ready state when not pulled to a not ready state by the transmitter or by one of the plurality of receivers, and
each of the receivers being configured to:
pull the sync conductor to a not ready state while performing an initialization process;
release the sync conductor when the initialization process is complete, and
perform a state transition when the sync conductor transitions from the not ready state to the ready state.

* * * * *